BEST AVAILABLE COPY
July 6, 1943. A. RAMSEY Re. 22,343
CUTOUT
Original Filed June 9, 1934
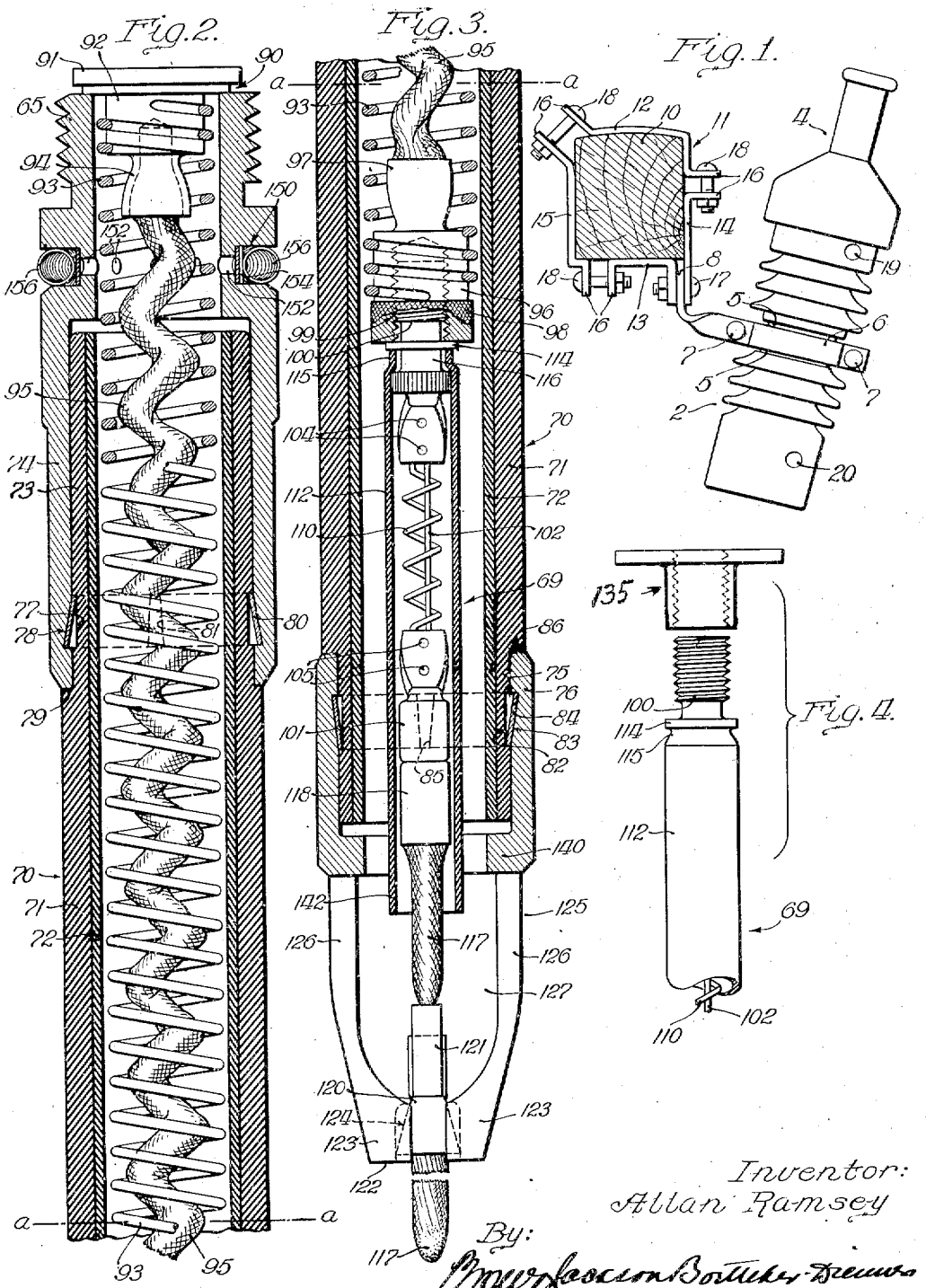
Inventor:
Allan Ramsey
By: Powell, Sessions, Bottler & Dienner
Attys.

Reissued July 6, 1943

Re. 22,343

BEST AVAILABLE COPY

UNITED STATES PATENT OFFICE 22,343

CUTOUT

Allan Ramsey, Evanston, Ill., assignor to Schweitzer & Conrad, Inc., Chicago, Ill., a corporation of Delaware Original No. 2,144,707, dated January 24, 1939, Serial No. 154,973, July 22, 1937, which is a division of Serial No. 730,075, June 9, 1934. Application for reissue May 7, 1943, Serial No. 486,085

47 Claims. (Cl. 200—117)

My invention relates to cutouts for electrical circuits.

This application constitutes a division of my copending application, Serial No. 730,075, filed June 9, 1934, and assigned to the assignee of this application, now Patent No. 2,108,993.

The fuse link assembly which I employ is of the type described and claimed in my copending application Serial No. 671,660, filed May 18, 1933, now Patent No. 2,091,453, with certain improvements to make is universal or adapt it for use with the fuse device constituting a part of the plug of the cutout of the present invention, and with the dropout type ejector cutout box of my copending application Serial No. 734,262, filed July 9, 1934.

This fuse link assembly also embodies an improved visual indicator feature and other improvements which will hereinafter appear.

An object of my invention is to provide an improved combination of an insulating outer sleeve having metallic ferrules constituting outer terminals, a pair of inner terminals within and adjacent one end of the outer sleeve and connected electrically with the outer terminals, one of the inner terminals being movable toward the other end of the sleeve, with a fusible element between the inner terminals and an inner sleeve of insulating material closely surrounding the inner terminals and closed by and attached to the movable inner terminal to move therewith toward the other end of the outer sleeve when the fusible element fuses.

A further object of my invention is to secure the fuse tube of a replaceable fuse link to one of a pair of relatively infusible terminals that are interconnected by fusible means, the other terminal being slidably mounted within the fuse tube and unattached thereto.

Still another object of my invention is to so construct the terminals of a replaceable fuse link that they may be deformed onto the fusible means interconnecting them.

A further object of my invention is to provide for deforming one end of a terminal of a fuse link onto a fusible element and a strain element or a fusible element alone and the other end onto a flexible lead comprising a plurality of strands of wire.

Another object of my invention is to provide a silver fusible element in the present combination with the outer insulating sleeve and the inner insulating sleeve closely surrounding the inner fuse terminals and closed by and attached to the movable inner terminal to move therewith toward the other end of the outer sleeve when the fusible element fuses, whereby the silver fusible element is excluded from too free access to atmosphere.

Further features and advantages and a concrete understanding of the present invention will be more apparent from the following detailed description taken in connection with the accompanying drawing, in which:

Figure 1 is a view illustrating my improved form of cutout mounted upon a cross arm and adapted to receive a fuse member;

Figures 2 and 3 are parts of a longitudinal sectional view through the fuse member adapted to be mounted in the cutout shown in Figure 1 (Figure 3 is to be laid below Figure 2 with the dot and dash line *a—a* of Figure 3 on the dot and dash line *a—a* of Figure 2); and Figure 4 is a fragmentary elevational view of the upper end of the fuse link assembly showing the same removed from the retraction spring and cable assembly and another form of terminal button applied directly to the upper fuse terminal thereof to provide for universal application.

The cutout of my present invention comprises an outer socket member 2, which carries the main contact terminals, and the removable plug member 4, which bears the fuse device for interrupting the circuit in case of overload or short circuit. It will be noted that the plug member 4 is adapted for insertion in the top of the socket member 2, this arrangement bearing particular relation to the type of fuse employed, as will hereinafter appear.

The socket member 2 principally consists of a tubular member of wet process porcelain, or other suitable insulation, finished with a chocolate glaze inside and out, and formed externally and intermediate its ends with two longitudinal spaced annular shoulders 5—5, between which engage a split clamp 6. The clamp 6 is gripped tightly about the body of the socket 2 by a pair of bolts 7 extending through the sides of the clamp and engaged in suitable nuts. One end of one side of the clamp 6 is extended and bent laterally to form a mounting tongue 8 which is secured, for example, to the cross-arm 10 of a transformer pole or other point of disconnection by a bracket 11. The holes through the clamp part having the extending tongue 8 for the bolts 7 are preferably of square or polygonal form, and the bolts 7 preferably have corresponding square or polygonal portions engaging therein to prevent turning of the bolts in drawing up the nuts.

The bracket 11 comprises four bracket parts 12, 13, 14 and 15. The part 12 fits the top of the cross-arm 10 and has one end turned down along one side of the cross-arm. The part 15 fits against the opposite side of the cross-arm and has its lower portion offset or turned in beneath the bottom of the cross-arm. These parts 12 and 15 have outwardly directed flanges 16 at their opposite ends. The parts 13 and 14 are interchangeable. The tongue 8 of the clamp 6 is swiveled between the extending end of the clamp part 14 and the flange on the adjacent end of the clamp part 13 upon a carriage bolt 17 which may be loosened to permit the cutout to be adjusted or swung to any angular position about the axis of the bolt 17, and tightened to clamp the cutout firmly in the position in which it is arranged. Carriage bolts 18 pass through the other pairs of spaced flanges 16 for gripping the bracket tightly in place about the cross-arm 10. The socket member 2 is provided with suitable openings 19 and 20 to permit insertion of suitable line conductors to connections to the main control terminals therein in a manner fully described in my copending application, of which this is a division.

The fuse construction which I employ in my improved cutout is of the type described and claimed in my copending application Serial No. 671,660, filed May 18, 1933, and embodies a number of improvements in this type of fuse, as will hereinafter appear. This fuse clears minor or low current faults as positively as it clears more severe faults, as during a short circuit or heavy overload; its operation does not require explosive action, but in all cases the instantaneous collapse of the coil spring establishes a definite and sufficient gap regardless of the amount of fault current. At the same time short circuit and heavy overload faults are cleared without attendant danger that excessive pressure may cause destruction of the equipment. Heavy pressures occur within a small cylinder or chamber which is a part of the fuse link, and the tube proper is freely vented. Pre-heating or corrosion does not deteriorate and result in "causeless" operation of the fuse element, because this element is made of a pure metal which has proved to be vastly superior from the standpoint of its resistance to corrosion and its ability to operate at a higher percentage of its melting point without deterioration. It is not necessary to replace unblown fuse links after an over-current has blown other fuses in the same circuit, and a permanent and exceptional accuracy of fuse ratings is obtained. The time delay characteristic and short arcing time make the fuse exceptionally suitable for selective operation.

Referring particularly to Figures 2 and 3, the universal fuse link shown generally at 69 is enclosed in a tube designated 70 in its entirety which is preferably formed of grade "X" rolled "Bakelite" or phenol condensation product tubing 71 rolled on a fiber liner 72, or other suitable insulating material. At its upper end the outer diameter of the tube 71 is reduced at 73 to receive the upper ferrule 74 which is preferably formed of brass rod or other suitable material. At its upper end 65 the ferrule 74 is threaded for mounting in a suitably threaded aperture in the plug member 4, Figure 1. At its lower end, the outer diameter of the tube 71 is reduced at 75 to receive the lower ferrule 76 which is preferably formed of cast hard bronze or other suitable material. The extreme ends of the tube 71 are preferably chamfered slightly, as illustrated. The upper reduced end of the tube 71 is provided with an external groove 77, and the inner surface of the ferrule 74 is provided with a downwardly flaring or generally conical groove 78 which, when the ferrule is in place upon the reduced upper end of the tube with its lower end in engagement with the shoulder 79, registers with the groove 77. A conical spring snap ring 80, formed of seamless brass tubing (half hard) and split at 81, engages the shoulder at the upper end of the groove 77 and the shoulder at the lower end of the groove 78, and anchors or secures the ferrule 74 firmly to the tube without screws or the like and at lower cost, and in a small space. At the same time, an exceptionally strong joint is provided between the tube and ferrule. In assembling these parts, the snap ring 80 may be applied to the groove 77 before placing the ferrule upon the tube. Then as the ferrule is passed down over the upper end of the tube, the larger lower end of the snap ring may be pressed into the groove 77 to permit passage of the ferrule into place, whereupon the ring 80 will spring out into the conical groove 78 and, by its engagement with the shoulder at the lower end of this groove, will anchor the ferrule firmly in place upon the tube.

The lower reduced end 75 of the tube 71 is provided with a groove 82 similar to the groove 77, and the inner surface of the ferrule 76 is provided with an upwardly flaring or generally conical groove 83 corresponding with the groove 78. A spring snap ring 84 split at 85, similar to the ring 80, and engaging in the grooves 82 and 83 in a similar manner, locks or secures the lower ferrule 76 firmly in place upon the lower reduced end of the tube 71. This ring 84 and the ferrule 76 may be applied in the manner described in connection with the ring 80 and the ferrule 74, and the upper end of the ferrule 76 engages the annular shoulder 86 at the upper end of the lower reduced portion 75.

The upper cable terminal and spring fastener 90, which is preferably formed of brass rod or other suitable material, is flanged or headed to form a button 91 which seats upon the upper end of the ferrule 74. The reduced portion 92, depending integrally from the button 91, has a helical groove into which the upper few turns of the coiled fuse spring 93 are threaded, and an integral depending socket 94 receives the upper end of the stranded cable 95 and is pressed securely thereon. The stranded cable 95, which is preferably of stranded copper or other suitable material, is connected to the lower cable terminal and spring fastener 96 by rigidly securing it in the socketed part 97 thereof, as by inserting it in the socket and pressing or flattening the socket firmly thereon and into secure engagement therewith. The terminal and fastener 96 has a helical groove for threaded engagement with the lower few turns of the spring 93.

The terminal 96 is knurled externally at 98 and is tapped or threaded internally at 99 for receiving the threaded upper end of the upper fuse terminal 100 of the fuse link 69, which terminal is formed of copper or other suitable or preferred material. The lower fuse terminal 101 of the fuse link 69 is formed of similar material, and this terminal and the terminal 100 are connected by a strain wire or tensile element 102 arranged to bear the mechanical stress. The upper end of

BEST AVAILABLE COPY the wire 102 is inserted in a socket or opening in the lower end of the terminal 100, and is secured rigidly in place as by punching at 104 the stock of the terminal 100 into firm binding engagement with the wire, or by flattening the socket firmly upon the wire. The lower end of the wire 102 is inserted in a socket or opening in the terminal 101, and is secured rigidly in place as by punching at 105 the stock of this terminal into firm binding engagement with the wire, or, as before, by flattening the socket upon the wire. The fuse 110 preferably is of silver, and the strain wire 102 preferably is of nickel chromium wire. The upper end of the fuse wire 110 is inserted in an opening in the terminal 100 and is secured firmly in place therein as by punching the adjacent side of the terminal into firm engagement therewith, or flattening the same thereon. The lower end of the wire 110 is inserted in an opening in the terminal 101 and may be secured firmly in place therein as by punching the adjacent sides of the terminal 101 into firm engagement therewith, or flattening the same thereon. Intermediate its ends the fuse wire 110 is coiled about the strain wire 102.

It has been found that silver, as used in devices of this sort, has unusual characteristics. First, there is not an appreciable absorption of oxygen until temperatures close to the melting point are reached, and this oxygen is released again upon a slight drop in temperature. Even if there is some oxidation, the oxide has conducting properties similar to those of silver. Also, it has been found that under certain circumstances, silver will form undesirable compounds with other elements on blowing. In some of the experiments and tests made on fuses under various conditions, the blowing of the fuse appeared to be more violent than the power current would seem to account for.

This applicant, by a combination of the silver fusible element with the outer insulating sleeve and the inner insulating sleeve closely surrounding the inner fuse terminals excludes the silver fusible element from too free access to atmosphere, and maintains this exclusion upon blowing of the fuse. The highly advantageous character of the silver, namely, that it appears to produce less metallic vapor for a given rating; that it will retain its form up to a very high temperature; that it will not oxidize and change its rating for the oxide appears to be conductive, and that the time-current characteristic, which is an all-important factor under certain circumstances, can readily be maintained over long periods, is utilized. Furthermore, because of the provision of the terminals 100 and 101 in relatively massive form and, therefore, relatively infusible, as compared to the strain wire 102 and the fuse wire 110, the arc formed on blowing is confined substantially only to the space between these terminals, and consequently it is possible to more readily extinguish it.

The fuse wire 110 of silver or other fusible conducting material, preferably whose oxide is a conductor, and the comparatively high resistance strain wire 102, both are completely enclosed and shielded from atmosphere, gases and moisture, by a tube 112 formed of fiber or other insulating material. The upper end of the tube 112 closely surrounds the upper fuse terminal 100 beneath the integral flange 114 thereon, and is shrunk or crimped at 115 into the annular groove 116 to close the upper end of the tube 112 against access of atmosphere to the silver fusible element and to secure the tube 112 to the upper fuse terminal 100. The lower end of the tube 112 passes freely over and closely surrounds the lower fuse terminal 101 and extends down to a position beneath this terminal and from the lower end of the fuse tube, as illustrated in Figure 3. The tube 112 offers no impairment to free separation of the terminals 100 and 101 upon blowing of the fuse, yet, at the same time, it is rigid throughout its length and by its engagement at the upper end with the terminal 100 and its cooperation with the terminal 101 holds the terminals 100 and 101 rigidly against relative lateral movement, such as otherwise might result in movement or even crimping or twisting of the fuse wire 110 and/or strain wire 102.

For the purpose of providing electrical connection to the lower terminal 101 of the fuse link 39 and setting the fuse and holding the same set, the low end of the terminal 101 is provided with an extension 117 formed of stranded conducting cable or other suitable material which forms a part of the fuse link 69 and is replaceable therewith. Several strands of copper cable, preferably tinned, or "depth" cable are employed in the illustrated embodiment, although this may, of course, vary widely. The upper end of this cable is inserted in a socket 118 on the lower end of the terminal 101, and this socket is flattened into firm engagement with the cable to secure the same therein. Within its length, the stranded cable 117 is provided with a conical bushing 120 securely anchored in position upon the cable 117 as by flattening the upper end of the bushing into firm engagement with the cable at 121. The lower conical part of the bushing 120 is engageable with a clip 122 to hold the fuse in set position. The clip 122 is formed by the outstanding and slightly hooked sides 123 of a conical socket 124 in the lower end of a tongue 125 formed integral with the lower ferrule 76 and depending therefrom, the integral sides 123 rounding or being hooked outwardly from the base of the tongue 125 at the lower extremities of the sides 126 which round outwardly from the depressed portion 127.

The extension or stranded cable 117 constitutes a tail extension which, when the spring 93 is retracted, extends down below the lower end of the fuse casing 70 and ferrule 76 so that it may be gripped conveniently for setting the fuse and placing the spring 93 under tension. With the spring 93 retracted, the setting of the fuse is accomplished by grasping the downwardly extending tail extension 117 and pulling the same downwardly against the tension of the spring 93 until the conical bushing 120 is positioned below or clear of the bottom of the clip 122. The cable 117 above the bushing 120 is then passed through the open side of the clip 122. Then, upon releasing the tail extension 117, the spring 93 draws the bushing up firmly against the conical socket 124 in the clip 122, and this cooperation of the bushing 120 with the hooked sides of the clip holds the spring 93 extended and the fuse in set position. A circuit is thus established from the ferrule 74, upper cable terminal and spring fastener 90, stranded conductor 95, lower cable terminal and spring fastener 96, upper fuse terminal 100, fuse wire 110 and strain wire 102 in parallel, lower fuse terminal 101, stranded conductor 117, bushing 120, and clip 122, to the lower ferrule 76 through the tongue 125. The tail extension 117 below the conical bushing 120 may be cut off or otherwise removed after the fuse is

BEST AVAILABLE COPY set, as above described, but it is to be understood that this removal of a part or all of the tail extension for setting the fuse or anchoring the lowering end of the fuse element assembly to the lower ferrule on the fuse casing is not necessary within the scope of the present invention.

The construction shown and described herein is a spring type expulsion fuse. A surrounding sectionalized cork (not shown) and an outer enclosing tube of waterproof paper, gummed paper or the like, may be placed around the insulating tube 112 as in my copending application Serial No. 671,660, now Patent No. 2,091,453, and this tube and the fuse link 69 may be modified in accordance therewith. In the case of an ordinary air-type expulsion fuse as disclosed in my said copending application, Serial No. 671,660, now Patent No. 2,091,453, or in the case of the drop out type ejector cutout box of my copending application Serial No. 734,262, filed July 9, 1934, the spring and cable assembly 93, 95 and the associated terminals 90 and 96 may be removed by unscrewing the upper fuse terminal 100 of the fuse link 69 from the tapped or threaded socket in the lower end of the terminal 96. Then, by merely threading the upper end of the upper fuse terminal 100 into a button 135 of suitable conducting material and flanged radially as shown in Figure 4, the same fuse link 69 is adapted for use with the ordinary air type expulsion fuse or with the drop out type ejector cutout box of my copending application, Serial No. 734,262. This makes the fuse link 69 universal, in that it is adapted for use in different types of fuse housings or mountings.

The cylinder or tube 112, which encloses the fuse element 110 and strain wire 102 of the fuse link 69, in addition to confining the arc in a very small space and preventing charring and metal spattering on the tube liner 72, and with its upper end closed to prevent too free access of atmosphere to the fusible link and maintain the closure upon fusing of the link, serves, by its downward extension below the ferrule 76 to perform the additional function of giving a visual indication when the fuse has been blown. Since the upper end of the tube or cylinder 112 is secured to the upper fuse terminal 100 by crimping or shrinking into the groove 116, it will be apparent that this tube 112 will move upwardly with the upper fuse terminal 100 and lower cable terminal and spring fastener 96 upon retraction of the spring 93. Consequently, the absence of the projection of the lower end of the tube 112 down from the bottom 140 of the ferrule 76 gives a visual indication that the fuse has blown and the spring 93 retracted. However, the presence of the lower end of the tube 112 beneath the bottom 140 of the ferrule 76 indicates visually that the fuse has not blown and that the device is in operative relation. The lower end of the tube 112, the absence or presence of which gives this indication, is indicated at 142 in Figure 3.

The current of my invention is set in operative relation by assembling the fuse parts as shown in Figures 2 and 3, and then screwing the upper threaded end 65 of the upper ferrule 74 into the plug member 4. The plug 4 is then inserted into the socket 2, as illustrated in Figure 1.

The upper ferrule 74 is provided with an annular groove 150 having spaced vent openings 152 therein that are normally closed by a pressure band 154 which is held in place by a coiled lock spring 156. On blowing of the fuse link 69, sufficient pressure is generated within the tube 70 to lift the band 154 and force the spring 156 outwardly into a suitable groove in the socket member 2, thereby locking the tube 70 and plug 4 to the socket member 2, as is more fully described in my copending application of which this application is a division.

To renew the fuse link or reload the device, the plug 4 is first withdrawn from the socket 2. The fuse tube 70 is then removed from the plug 4 by unscrewing the threaded upper end 65 of the ferrule 74. The spring and flexible lead assembly are withdrawn from the tube 70 and then the remains of the blown fuse link 69 are then removed by unscrewing the upper fuse terminal 100 from the cable terminal and spring fastener 96, whereupon a new fuse link 69 is applied by screwing the upper terminal thereof into the tapped opening in the terminal 96. The fuse link 69 and spring and cable assembly are then inserted into the fuse tube 70 through the upper end of the upper ferrule 74. The tail extension 117 is then grasped and drawn downwardly against the tension of the spring 93 and the conical bushing 120 engaged in the clip 122, whereupon the excess tail extension below the bushing 120 may be cut off with a pair of pliers.

While I have shown and described my invention with reference to the particular details of construction of one embodiment, it is to be understood that the invention may appear in different forms and with numerous modifications and variations such as will suggest themselves to one skilled in the art, and it is to be further understood that I consider all such modifications and variations to be included within the scope of my invention.

I claim:

1. In a device of the class described, a movable system including a movable terminal member, a coil spring normally under tension and connected to said terminal member, a fuse link having a fuse terminal for connection with the terminal of said movable system, and a second fuse terminal, a rigid tubular insulating envelope secured to the fuse terminal for connection with the terminal of the movable system and being movable therewith and fitting telescopically over the other fuse terminal, and a fusible element within said envelope, said tubular envelope being out of contact with the fusible element.

2. In combination, an outer sleeve, a pair of fuse terminals within said sleeve, a fusible link between said terminals, an inner sleeve closely surrounding said inner terminals and said fusible link and projecting from said outer sleeve, and means to retract the inner sleeve when the link is fused.

3. In a device of the class described, a fuse tube, a movable system within said tube including a movable terminal member, a coil spring normally under tension and connected to said terminal member, a fuse link having a fuse terminal for connection with the terminal of said movable system and a second fuse terminal, a rigid insulating envelope secured to the fuse terminal for connection with the terminal of the movable system, said envelope fitting telescopically over the other fuse terminal and extending from the end of the fuse tube for indicating the condition of the fuse, and a fusible element within said envelope.

4. In combination, a fuse tube, a movable system within said tube including a movable terminal and a coil spring normally under tension

BEST AVAILABLE COPY and connected to said terminal, a fuse link assembly for connection to said terminal, and means for connection to the movable system and projecting from the end of the fuse tube when the spring is under tension and retracted from the end of the fuse tube upon retraction of the spring to indicate the condition of the fuse.

5. In a fuse, an insulating outer sleeve having metallic ferrules constituting outer terminals, a pair of inner terminals within and adjacent one end of the outer sleeve and connected electrically with the outer terminals, one of said inner terminals being movable toward the other end of the sleeve, a fusible element between the inner terminals, and an inner sleeve of insulating material closely surrounding the inner terminals and the fusible element and closed by and attached to the movable inner terminal adapted to move therewith toward the other end of the outer sleeve when the fusible element fuses.

6. In a fuse, an insulating outer sleeve having metallic ferrules constituting outer terminals, a pair of inner terminals within and adjacent one end of the outer sleeve and connected electrically with the outer terminals, one of said inner terminals being movable toward the other end of the sleeve, a fusible element between the inner terminals, and an inner sleeve of insulating material closely surrounding the inner terminals and the fusible element and closed by and attached to the movable inner terminal adapted to move therewith toward the other end of the outer sleeve when the fusible element fuses, the other inner terminal being adapted for relative movement through the inner sleeve and out of the end thereof.

7. In a fuse, an insulating outer sleeve having metallic ferrules constituting outer terminals, a pair of inner terminals within and adjacent one end of the outer sleeve and connected electrically with the outer terminals, one of said inner terminals being movable toward the other end of the sleeve, a fusible element between the inner terminals, an inner sleeve of insulating material closely surrounding the inner terminals and the fusible element and closed by and attached to the movable inner terminal, and a spring for retracting the movable terminal and the inner sleeve toward the other end of the outer sleeve when the fusible element fuses.

8. In a fuse, an insulating outer sleeve having metallic ferrules constituting outer terminals, a pair of inner terminals within and adjacent one end of the outer sleeve and connected electrically with the outer terminals, one of said inner terminals being movable toward the other end of the sleeve, a silver fuse link between the inner terminals, and an inner sleeve of insulating material closely surrounding the inner terminals and the fusible element and closed by and attached to the movable inner terminal adapted to move therewith toward the other end of the outer sleeve when the fusible element fuses.

9. In a fuse, an outer insulating member having a bore of relatively large diameter, an inner insulating member having a bore of relatively small diameter, terminals and a fusible element closely surrounded by the bore of the inner member, one terminal forming a permanent closure for one end of the bore of the inner insulating member, and means for moving said latter terminal and the inner insulating member when the fusible element fuses to lengthen the arc within the inner bore.

10. In a fuse, an outer insulating member having a bore of relatively large diameter, an inner insulating member having a bore of relatively small diameter, terminals and a fusible element closely surrounded by the bore of the inner member, one terminal forming a permanent closure for one end of the bore of the inner insulating member, and means for moving said latter terminal and the inner insulating member when the fusible element fuses to lengthen the arc first within the bore of the inner insulating member and later within the bore of the outer insulating member.

11. In a fuse, an outer insulating member having a bore of relatively large diameter, an inner insulating member having a bore of relatively small diameter, terminals and a fusible element closely surrounded by the bore of the inner member, one terminal forming a permanent closure for one end of the bore of the inner insulating member, and means for moving said latter terminal and the inner insulating member when the fusible element fuses to lengthen the arc first within the bore of the inner insulating member and later within the bore of the outer insulating member, one terminal and the adjacent end of the arc being closely surrounded by the relatively small diameter bore of the inner insulating member throughout the duration of the arc.

12. In a fuse, an outer insulating member having a bore of relatively large diameter, an inner insulating member having a bore of relatively small diameter, terminals and a silver fuse link closely surrounded by the bore of the inner member, one terminal forming a permanent closure for one end of the bore of the inner insulating member, and means for moving said latter terminal and the inner insulating member when the fusible element fuses to lengthen the arc within the inner bore.

13. An article of manufacture comprising a renewable unit for a fuse comprising a pair of fuse terminals, a stress sustaining link connecting said terminals, a fusible link connected at its ends to said terminals and having its intermediate portion formed into a coil and independent of said sustaining link, and an insulating sleeve closely surrounding the fuse terminals but being out of contact with the fusible link and the stress sustaining link and being closed by and attached to one of said inner terminals.

14. A renewable unit for a fuse comprising a pair of fuse terminals, stress sustaining and fusible links connecting said terminals, an insulating sleeve closely surrounding the fuse terminals and the stress sustaining and fusible links and closed by and attached to one of said terminals, and means interchangeably attachable to said latter terminal for adapting the unit for use in an ordinary air expulsion fuse and in a retraction fuse having means for moving one of said terminals.

15. In combination, an outer sleeve, a pair of fuse terminals within said sleeve, a fusible link between said terminals, and an inner sleeve closely surrounding said inner terminals and said fusible link and projecting from said outer sleeve, said inner sleeve being adapted to be drawn into said outer sleeve upon fusing of said link.

16. In a fuse, an insulating outer sleeve having metallic ferrules constituting outer terminals, a pair of inner terminals within said sleeve, a fusible element between the inner terminals, and an inner sleeve of insulating material closely surrounding the inner terminals and the fusible element and closed by and attached to one of

BEST AVAILABLE COPY said inner terminals, said inner sleeve being appreciably longer than the distance between said inner terminals and relatively short with respect to the outer sleeve.

17. In a fuse, an insulating outer sleeve having ferrules constituting outer terminals, a pair of fuse terminals within said sleeve, a fusible element between said terminals, an inner sleeve closely surrounding said terminals and said element for accumulation of pressure upon blowing of the fuse, one fuse terminal being movable within the inner sleeve for elongation of the arc within said sleeve and movable from the inner sleeve to release the pressure and permit an outward flow of gases from the sleeve, said inner sleeve and the other terminal being movable further to elongate the arc.

18. A renewable fuse link comprising a first terminal having a threaded stud at one end, an arcing tip at the other end, and having an intermediate groove, a second terminal comprising an arcing tip at one end and a flexible lead attached to the other end, a fusible element, said arcing tips having means for mechanically gripping the ends of said element and a fiber tube surrounding said terminals and the element and being anchored at one end to said groove, said flexible lead extending out of the open end of the tube.

19. The combination with claim 18 of a stress sustaining link connected between the arcing tips to relieve the fusible element of tension, said tube being out of contact with the element and the stress sustaining link, said second terminal fitting loosely in the bore of the tube, whereby it tends to be expelled upon the generation of gases by the arc.

20. In a fusible current interrupter, a link comprising the combination of a current sensitive element adapted to be fused upon the passage therethrough of current in excess of a predetermined value for a predetermined period of time, a relatively thin walled tubular envelope of substantially uniform bore surrounding the said element but being out of contact therewith, rigid metal terminals for the element, said terminals being of a current carrying capacity high enough to remain unfused upon the passage therethrough of any value of current within the capacity for which the interrupter is designed, said tubular envelope extending beyond the ends of the element and telescoping with said terminals, one end of said tube being closed by the corresponding one terminal and the other terminal substantially filling and being slidable in the bore of the tubular envelope, said latter terminal being adapted to be moved out of the envelope upon fusing of said element.

21. The link of claim 20 further characterized by a coupling head forming a rigid extension of the said one terminal for supporting one end of the link, and a flexible lead joined to and extending from said other terminal.

22. A terminal for a fuse link comprising a rodlike section having a tubular socket on each end, a flexible lead disposed in one socket, said one socket being collapsed upon the flexible lead to connect the same mechanically and electrically, a fusible element disposed in the other socket, said other socket being collapsed upon the fusible element to form a good electrical and mechanical connection, said terminal being of sufficient mass and conductivity to serve as a barrier for the arc between the fusible element and the flexible lead.

23. The combination of claim 22 wherein the collapsed sockets are of a maximum transverse dimension substantially not in excess of the maximum diameter of the rodlike section.

24. The terminal of claim 22 wherein the second socket has localized indentations of the walls of the socket upon the element to produce localized deformations of the element and the socket to improve the mechanical and electrical connection of the same.

25. A terminal for a fuse link comprising a central rodlike section having sockets upon each end, a flexible lead disposed in one socket, the walls of the socket being deformed to make connection mechanically and electrically between the terminal and the lead, a fusible element and a strain element disposed in the second socket, said second socket having the walls thereof collapsed upon the fusible element and the strain element, the walls of the second socket being locally deformed to produce localized deformation of the socket and the element to improve the mechanical and electrical connection of the elements with said second socket.

26. The method of joining a rodlike terminal to a fusible element which comprises forming a socket in one end of the rodlike terminal of an internal diameter substantially in excess of the diameter of the fusible element, introducing the fusible element into the socket, collapsing the walls of said socket into contact with the sides of the fusible element, and applying localized pressure to a wall of the socket adjacent the fusible element, whereby a localized deformation of the socket and the element is produced to improve the mechanical and electrical bond between the terminal and the element.

27. A fuse link comprising an outer cylindrical terminal member and an inner cylindrical terminal member, said members having sockets facing towards each other, a strain wire and a silver fuse wire embraced within and held by said sockets, a small bore thin-walled fiber tube anchored to and closed by the outer terminal and relatively closely embracing the inner terminal but permitting free expulsion of the inner terminal from the adjacent end of the tube, said inner terminal constituting a piston-like obstruction to the escape of gases generated by the arc produced upon melting of the fusible element, and a flexible lead secured to the inner terminal member and extending out of the open end of the tube.

28. In a fuse link, a terminal having a knurled portion, and a sleeve of insulation frictionally engaging said knurled portion, said knurling extending longitudinally of said terminal and sleeve to prevent relative rotation thereof.

29. In a fuse link, a terminal having a peripheral groove and a knurled portion, and a sleeve of insulation frictionally engaging said knurled portion, said knurling extending longitudinally of said terminal and sleeve to prevent relative rotation thereof and said sleeve interfitting with said groove to prevent relative longitudinal movement between it and said terminal.

30. In a fuse link, a terminal having an attaching portion at one end, a fuse element receiving portion at the other end and a peripheral groove and a knurled portion intermediate said ends, and a fiber tube frictionally engaging said knurled portion and shrunk into said groove for preventing relative rotary and axial movement between said terminal and said sleeve.

31. In a fuse, in combination, an insulating

BEST AVAILABLE COPY outer sleeve, a pair of relatively infusible terminals within said insulating outer sleeve, a fuse wire interconnecting said relatively infusible terminals, and an inner sleeve of insulating material surrounding said relatively infusible terminals and attached to one of them, said inner sleeve of insulating material being appreciably longer than the distance between said relatively infusible terminals and relatively short with respect to said insulating outer sleeve.

32. A renewable fuse link comprising, in combination; a first terminal having support means at one end, an arcing tip at the other end, and a groove intermediate said ends; a second terminal comprising an arcing tip at one end and a flexible lead attached to the other end, a fusible element, said arcing tips having means for mechanically gripping the ends of said fusible element, and an insulating tube surrounding said first and second terminals and said fusible element and being anchored at one end in said groove, said flexible lead extending out of the other end of said insulating tube.

33. In a fuse link having a fusible element, a terminal for said fusible element having a current carrying capacity such that it remains substantially unfused upon flow of any value of current within the intended interrupting capacity of said fusible element, one end of said terminal being formed to receive one end of said fusible element and being collapsed and locally deformed thereon to provide mechanical and electrical connections thereto, and means at the other end of said terminal for connecting it in an electric circuit.

34. A fuse link comprising, in combination; a first terminal having an attaching portion at one end, a fusible element receiving portion at the other end, and a peripheral groove and a knurled portion intermediate its ends; a tubular insulating member at one end frictionally engaging said knurled portion and interfitting with said groove; a second terminal movably mounted in said tubular insulating member and having a fusible element receiving portion at one end and a conductor receiving portion at the other end; and a fusible element interconnecting said fusible element receiving portions.

35. A fuse link comprising, in combination; a first terminal having an attaching portion at one end, a fusible element receiving portion at the other end, and a peripheral groove and a knurled portion intermediate its ends; a tubular insulating member at one end frictionally engaging said knurled portion and interfitting with said groove; a second terminal movably mounted entirely within said tubular insulating member and having a fusible element receiving portion at one end and a conductor receiving portion at the other end; a fusible element interconnecting said fusible element receiving portions, and a stranded conductor connected to said conductor receiving portion of said second terminal and extending out of the other end of said tubular insulating member.

36. A renewable fuse link for mounting in different types of fuse housings comprising, a tubular member of insulating material, a fusible section in said tubular member, a flexible terminal connected to one end of said fusible section and extending out of one end of said tubular member, a rigid terminal connected to the other end of said fusible section and extending out of the other end of said tubular member, a fixed head on the outer end of said rigid terminal, and a removable head surrounding said fixed head.

37. A renewable fuse link for mounting in different types of fuse housings comprising, a fuse tube, a terminal at one end of said fuse tube, a flexible lead extending out of the other end of said fuse tube, fusible means interconnecting said terminal and said flexible lead, and means interchangeably cooperating with said terminal for adapting said fuse link for use in said different types of fuse housings.

38. A renewable fuse link for mounting in different types of fuse housings comprising, a fuse tube, a terminal at one end of said fuse tube, a flexible lead extending out of the other end of said fuse tube, fusible means interconnecting said terminal and said flexible lead, and means interchangeably attachable to said terminal for adapting said fuse link for use in an ordinary air expulsion fuse housing and in a retraction fuse housing having means for moving said terminal.

39. A renewable fuse link for mounting in different types of fuse housings comprising, a fuse tube, a terminal at one end of said fuse tube, a flexible lead extending out of the other end of said fuse tube, fusible means interconnecting said terminal and said flexible lead, threaded means on said terminal, and an adapter threaded for engagement with said threaded means and having a flanged head for adapting said fuse link for use in different types of fuse housings.

40. A renewable fuse link for mounting in different types of fuse housings comprising, a fuse tube, a relatively infusible terminal attached to one end of said fuse tube, a flexible lead extending out of the other end of said fuse tube, fusible means interconnecting said terminal and said flexible lead, a threaded stud on said terminal, and an adapter threaded at one end for attachment to said threaded stud and having a flanged head at the other end for adapting said fuse link for use in an ordinary air expulsion fuse housing and in a retraction fuse housing having means for moving said terminal.

41. A unitary fuse link structure adapted to be positioned in a fuse cartridge, said link structure comprising a tubular element, a conducting element carried by the upper end of said tubular element for engagement with a terminal, conducting means extending from the other end of said tubular element and of sufficient length to extend out of the fuse cartridge for connection to a second terminal, a fusible element electrically connecting said conducting means and said first mentioned conducting element, and resilient means tensioning said fusible element and acting to quickly increase the gap between the parts of the fusible element when the latter is ruptured by overload current, said conducting means being unattached to the tubular element and movable relative to the lower end thereof by the action of the resilient means after rupture of the fusible element.

42. A unitary fuse link structure adapted to be positioned in a fuse cartridge, said link structure comprising a tubular element, a conducting element carried by the upper end of said tubular element for engagement with a terminal, conducting means extending from the other end of said tubular element and of sufficient length to extend out of the fuse cartridge for connection to a second terminal, a fusible element electrically connecting said conducting means and said first mentioned conducting element, and coil spring means disposed within the fuse cartridge

BEST AVAILABLE COPY and externally of said tubular element and acting to quickly increase the gap between the parts of the fusible element when the latter is ruptured by overload current, said conducting means being unattached to the tubular element and movable relative to the lower end thereof by the action of said coil spring means after rupture of the fusible element.

43. In a fuse, an insulating outer sleeve having outer terminals adjacent its ends, a pair of inner terminals within said sleeve, one of said inner terminals being connected to one of said outer terminals and the other inner terminal including a flexible lead for connection to the other outer terminal, a fusible element interconnecting said inner terminals, an inner sleeve of insulating material mounted on said one inner terminal and extending over said fusible element and said other inner terminal, said inner sleeve being appreciably longer than said fusible element and relatively short with respect to said outer sleeve, and spring means within said outer sleeve tensioning said fusible element and acting to quickly increase the gap between the parts of the fusible element when the latter is ruptured by overload current.

44. In a fuse, an insulating outer sleeve having outer terminals adjacent its ends, a pair of inner terminals within said sleeve, one of said inner terminals being connected to one of said outer terminals and the other inner terminal including a flexible lead for connection to the other outer terminal, a fusible element interconnecting said inner terminals, an inner sleeve of insulating material mounted on said one inner terminal and extending over said fusible element and said other inner terminal, said inner sleeve being appreciably longer than said fusible element and relatively short with respect to said outer sleeve, and coil spring means disposed within said outer sleeve and externally of said inner sleeve and acting to quickly increase the gap between the parts of the fusible element when the latter is ruptured by overload current.

45. A replaceable fuse link comprising, a pair of relatively infusible terminals, fusible means interconnecting said terminals, and a sleeve of insulating material surrounding said terminals and said fusible means and being appreciably longer than the distance between said terminals.

46. A replaceable fuse link comprising, in combination, a pair of relatively infusible terminals, fusible means interconnecting said terminals, a sleeve of insulating material surrounding said terminals and said fusible means and being appreciably longer than the distance between said terminals, one of said terminals being located at one end of said sleeve and the other being freely movable out of its other end, and conducting means connected to said other terminal and extending out of said other end of said sleeve.

47. A replaceable fuse link comprising, in combination, a fuse tube, a relatively infusible terminal at one end of said fuse tube, a conductor extending out of the other end of said fuse tube including a relatively infusible terminal and a flexible lead, and strain and fusible elements interconnecting said terminals, said fuse tube being appreciably longer than the distance between said terminals and said conductor being freely movable out of said fuse tube on blowing of said strain and fusible elements.

ALLAN RAMSEY.